United States Patent
Lin et al.

(10) Patent No.: US 8,799,688 B2
(45) Date of Patent: Aug. 5, 2014

(54) BRIDGE CAPABLE OF POWER SAVING BY RECEIVING A SIGNAL TRANSMITTED FROM A HOST THROUGH A POWER PIN OF A CONNECTOR

(75) Inventors: Hui-Chih Lin, Taipei (TW); Wei-Hung Chen, Taipei (TW)

(73) Assignee: Via Technologies, Inc., New Taipei (TW)

( * ) Notice: Subject to any disclaimer, the term of this patent is extended or adjusted under 35 U.S.C. 154(b) by 190 days.

(21) Appl. No.: 13/473,052

(22) Filed: May 16, 2012

(65) Prior Publication Data

US 2012/0297222 A1  Nov. 22, 2012

Related U.S. Application Data

(60) Provisional application No. 61/486,593, filed on May 16, 2011.

(51) Int. Cl.
*G06F 1/26* (2006.01)
*G06F 1/32* (2006.01)

(52) U.S. Cl.
USPC ............................. 713/300; 713/320; 713/323

(58) Field of Classification Search
CPC ................................ G06F 1/3296; G06F 1/323
USPC .................................................. 713/320, 323
See application file for complete search history.

(56) References Cited

U.S. PATENT DOCUMENTS

| | | | | |
|---|---|---|---|---|
| 6,363,491 | B1* | 3/2002 | Endo | 713/310 |
| 7,197,578 | B1* | 3/2007 | Jacobs | 710/14 |
| 7,711,970 | B2* | 5/2010 | Keller | 713/323 |
| 2003/0070103 | A1* | 4/2003 | Kim | 713/300 |
| 2007/0079157 | A1* | 4/2007 | Wang et al. | 713/300 |
| 2009/0210734 | A1* | 8/2009 | Schramm et al. | 713/324 |
| 2012/0084578 | A1* | 4/2012 | Ghosh et al. | 713/300 |
| 2012/0210144 | A1* | 8/2012 | Wiehardt et al. | 713/300 |

* cited by examiner

*Primary Examiner* — Vincent Tran
(74) *Attorney, Agent, or Firm* — McClure, Qualey & Rodack, LLP

(57) ABSTRACT

A bridge is provided. The bridge is coupled between a host and a peripheral apparatus and includes a connector, a power circuit, and a bridge circuit. The connector connects the host and comprises a power pin. The power circuit converts a supplying power to a driving voltage when the power circuit is enabled. The bridge circuit is powered by the driving voltage and performs a data transmission procedure between the host and the peripheral apparatus. An enabling terminal of the power circuit is coupled to the power pin to receive an enabling signal transmitted by the host through the power pin. The power circuit is enabled to provide the driving voltage when the enabling signal is provided with a first potential. The power circuit is disabled to stop providing the driving voltage when the enabling signal is provided with a second potential.

20 Claims, 3 Drawing Sheets

BRIDGE CAPABLE OF POWER SAVING BY RECEIVING A SIGNAL TRANSMITTED FROM A HOST THROUGH A POWER PIN OF A CONNECTOR

CROSS REFERENCE TO RELATED APPLICATIONS

This application claims the benefit of U.S. Provisional Application No. 61/486,593, filed on May 16, 2011, the contents of which are incorporated herein by reference.

BACKGROUND OF THE INVENTION

1. Field of the Invention

The invention relates to an electronic apparatus, and more particularly to a bridge capable of saving power consumption and avoiding failure in operations.

2. Description of the Related Art

In general, a host may be provided with one or more connection ports to communicate with peripheral apparatuses. Each of the connection ports may relate to one communication protocol. When a peripheral apparatus does not support the communication protocol of the corresponding connection ports, a bridge is required for communication protocol transformation, such that the host can communicate with the peripheral apparatus through the bridge.

Currently, a peripheral apparatus may be integrated with a bridge and disposed on the same circuit board. When a host enters a power saving state, the bridge can operates at a standby state and drives the peripheral apparatus also enters a state of low power consumption. However, current design of a power supplying circuit of a bridge may cause the operation current of the bridge to reach 40 mA, which make the entire power consumption of the circuit board too large to confirm to 2013 power regulation established by European Union (EU).

When the host returns a normal operation state from the power saving state, the bridge may re-establish a link with the host, such that the host may continuously communicate with the peripheral apparatus. However, the bridge might re-establish the link after completing the initialization of the peripheral apparatus, and it takes a time period to complete the initialization of the peripheral apparatus. When the host transmits commands to the peripheral apparatus during the time period, hardware (such as logic circuits) of the bridge can not process the commands successfully due to the incomplete initialization of the peripheral apparatus, which causes that the operation to the peripheral apparatus fails.

BRIEF SUMMARY OF THE INVENTION

An exemplary embodiment of a bridge is provided. The bridge is coupled between a host and a peripheral apparatus. The bridge comprises a connector, a power circuit, and a bridge circuit. The connector connects the host. The connector comprises a power pin and a command pin. The power circuit receives a supplying power and converts the supplying power to a driving voltage when the power circuit is enabled. The bridge circuit is powered by the driving voltage and performs a data transmission procedure between the host and the peripheral apparatus. The power circuit has an enabling terminal, and the enabling terminal is coupled to the power pin to receive an enabling signal transmitted by the host through the power pin. The power circuit is enabled to provide the driving voltage when the enabling signal is provided with a first potential. The power circuit is disabled to stop providing the driving voltage when the enabling signal is provided with a second potential.

An exemplary embodiment of an operation method for a bridge is provided. The bridge is coupled between a host and a peripheral apparatus. The bridge comprises a connector, a power circuit, and a bridge circuit. The operation method comprises receiving an enabling signal transmitted from the host through a power pin of the connector and transmitting the enabling signal to an enabling terminal of the power circuit. The operation method also comprises enabling the power circuit to convert a supplying power to a driving voltage and powering the bridge circuit and the peripheral apparatus by the driving voltage when the enabling signal is provided with a first potential. The operation method further comprises disabling the power circuit to stop providing the driving voltage when the enabling signal is provided with a second potential. The host performs a data transmission procedure in company with the peripheral apparatus through a command pin of the connector A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
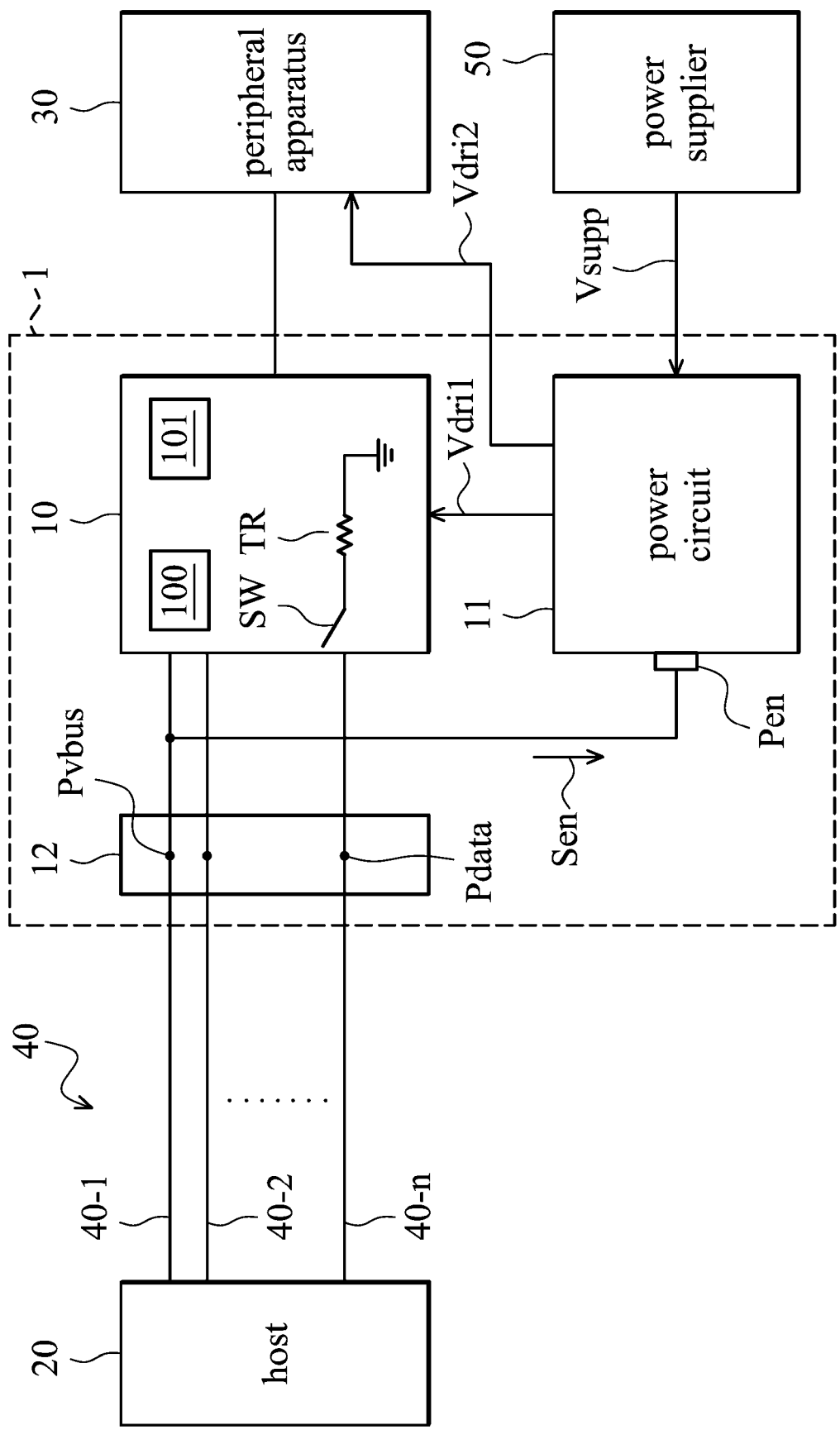
FIG. 1 shows an exemplary embodiment of a bridge of the present invention.

FIG. 1 shows an exemplary embodiment of a bridge of the present invention. For clear description, a bridge 1 is coupled between a host 20 and a peripheral apparatus 30 as shown in FIG. 1. The bridge 1 comprises a bridge circuit 10, a power circuit 11, and a connector 12. The connector 12 comprises a power pin Pvbus and at least one command pin Pdata. The connector 12 can be implemented as a communication interface. In an embodiment, the connector 12 is a Universal Serial Bus (USB) connector which conforms to the USB standard and coupled to the host through a bus 40 (in an embodiment, implemented by an USB), so that the peripheral apparatus 30 can communicate with the host 20 for data transmission. In other embodiments, the connector 12 may be a communication interface of other specification, such as an IEEE 1394 interface. The peripheral apparatus 30 may be a data access device (such as a hard disc, a memory, or an optical disc drive) or other electronic apparatuses. Moreover, the standard applied to the peripheral apparatus 30 is different from the standard applied to the connector 12 of the bridge 1, such as the Serial Advanced Technology Attachment (SATA). That is the peripheral apparatus 30 is a peripheral apparatus supplying SATA standard, however, without limitation to the invention. While the bridge 1 can accomplish the transformation of the communication protocols of the standards applied to the connector 12 and the peripheral apparatus 30, the standard applied to the peripheral apparatus 30 is in the scope of the invention.

The power circuit 11 has an enabling terminal Pen. The enabling terminal Pen is coupled to the power pin Pvbus of the connector 12 (such as the VBUS pin of the USB connector) to receive an enabling signal Sen transmitted from the host 20. The enabling or disabling state of the power circuit 11 is controlled by the potential of the enabling terminal Pen. When the enabling signal Pen is provided with a first potential, the power circuit 11 is enabled to convert a supplying power Vsupp provided by a power supplier 50 to a first driving voltage Vdri1 and a second driving voltage Vdri2. The first driving voltage Vdri1 and the second driving Vdri2 can power the bridge circuit 10 and the peripheral apparatus 30 respectively. When the enabling signal Sen is provided with a second potential, the power circuit 11 is disabled. In other words, at this time, the power circuit 11 is turned off and stops providing the first driving voltage Vdri1 and the second driving voltage Vdri2 to r the bridge circuit 10 and the peripheral apparatus 30 respectively. In an embodiment, the first potential is higher than the second potential. Preferably, the first potential is 5V and the second potential is 0V, however, without limitation. In the embodiment, the power circuit 11 provides the first driving voltage Vdri1 and the second driving voltage Vdri2 to the bridge circuit 10 and the peripheral apparatus 30 respectively. However, when the voltage values of the supplying voltages respectively required for the bridge circuit 10 and the peripheral apparatus 30 are equal, the power circuit 11 can provide the same driving voltage (such as the first driving voltage Vdri1 or the second driving voltage Vdri2) to the bridge circuit 10 and the peripheral apparatus 30 at the same time.

As described above, since the power pin Pvbus of the connector 12 and the enabling terminal Pen of the power circuit 11 are connected with each other, the potential on a line 40-1 of the bus 40 which is coupled to the power pin Pvbus controls the potential of the enabling signal Sen at the enabling terminal Pen. The potential on the line 40-1 is controlled by the host 20. When the host 20 is at a normal operation state, the host 20 provides the enabling signal Sen with the first potential (such as 5V) to the power pin Pvbus of the connector 12 through the line 40-1 of the bus 40 to enable the power circuit 11. At this time, the power circuit 11 provides the first driving voltage Vdri1 and the second driving voltage Vdri2 to the bridge circuit 10 and the peripheral apparatus 30 respectively. Then, the bridge circuit 10 enters an operation state to perform a data transmission procedure between the host 20 and the peripheral apparatus 30.

On the other hand, when the host 20 enters a power saving state, the host 20 transmits a suspend command to the bridge circuit 10 through lines 40-2~40-n of the bus 40. Since the bridge circuit 10 receives the suspend command from the host 20, the bridge 1 may operate at a power saving mode according to the suspend command. However, in this power saving mode, the whole power consumption of the bridge 1 is reduced, but the whole power consumption still does not confirm to the 2013 power regulation established by European Union (EU). In an embodiment, when the host 20 enters the power saving state, the enabling signal Sen with the second potential (such as 0V) is provided through the line 40-1, and the potential at the enabling terminal Pen of the power circuit 11 is the second potential. At this time, the power circuit 11 is disabled and does not provide the first driving voltage Vdri1 and the second driving voltage Vdri2 to the bridge circuit 10 and the peripheral apparatus 30 respectively. In this situation, since the bridge circuit 10 and the peripheral apparatus 30 are not powered by the first driving voltage Vdri1 and the second driving voltage Vdri2 respectively, the bridge circuit 10 and the peripheral apparatus 30 are totally disabled. In other words, the entire bridge circuit 11 is at a state where there is no any power and the bridge circuit 11 can not work, and the peripheral apparatus 30 is also at a state where there is no any power. In an embodiment, the normal operation state of the host 20 is the S0 state defined by Advanced Configuration and Power Interface (ACPI), and the power saving state of the host 20 is the S1, S2, S3, or S4 state defined by ACPI.

In summary, the power circuit 11 is controlled by the enabling signal Sen to be enabled or disabled. Accordingly, when the host 20 coupled to the bridge 1 is at the power saving state and provides the enabling signal Sen with the second potential (such as 0V) to the power pin Pvbus of the connector 12, the power circuit 11 is disabled by the enabling signal Sen with the second potential, such that the portions (comprising the bridge circuit 10 and the power circuit 11) of the entire bridge 1 which require power for operation stop working and do not consume any power to confirm to the 2013 power regulation established by European Union (EU). In another embodiment, when the host 20 is disconnected from the bridge 1 (such as the bus 40 is pulled up), the enabling terminal Pen is floating, and the potential at the enabling terminal Pen is also equal to the second potential (such as 0V). At this time, the entire bridge 1 stops working and does not consume any power.

Figure 2:
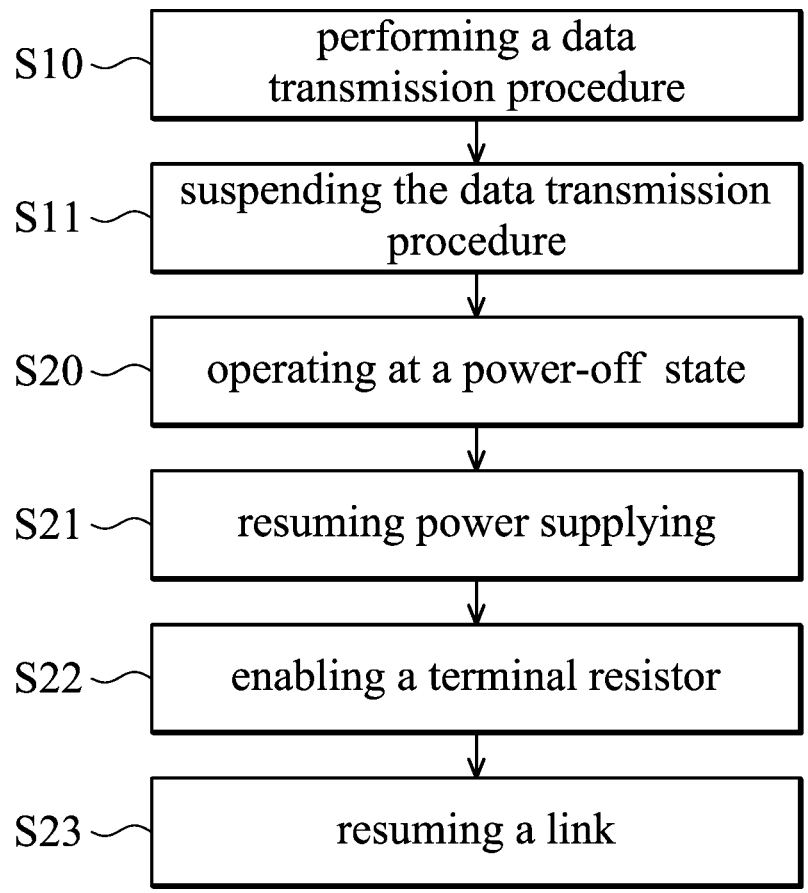
FIG. 2 is a flow chart of one exemplary embodiment of an operation method for a bridge.

In the following, an exemplary embodiment of an operation method of the bridge 1 performing a data transmission procedure is described by referring to FIGS. 1 and 2.

In Step S10, when the host 20 operates at a normal operation state, the host 20 performs a data transmission procedure in company with the peripheral apparatus 30 through the bridge 1. The host 20 may access the data of the peripheral apparatus 30 through the data transmission procedure. A case where the host 20 stores a file to the peripheral apparatus 30 is given as an example. When the host 20 stores the file to the peripheral apparatus 30, the host 20 accomplishes the file transmission through the data transmission procedure. The data transmission procedure comprises a plurality of access commands (the number of the access commands are based on the size of the file), and each access command corresponds to one portion of the file. When all of the access commands are transmitted to the peripheral apparatus 30 coupled to the bridge 1 respectively, the data transmission procedure is complete. Moreover, when the bridge 1 receives any access command transmitted from the host 20, the hardware (such as logic circuits) in the bridge circuit 10 can reply a handshake packet to the host 20 to notify the host 20 that the access command has be transmitted to the bridge 1.

In Step S11, the data transmission procedure is suspended. As described above, the data transmission procedure comprises the plurality of access commands. When the host 20 is requested to switch to the power saving state from the normal operation state during the data transmission procedure, the host 20 waits for that the transmission of the access command being transmitted is complete and a handshake packet is replied, and then the host 20 suspends the data transmission procedure and enters the power saving state. At the power saving state, the host 20 does not transmit data commands of the data transmission procedure any more.

In Step S20, the host 20 transmits a suspend command to the bridge 10 through the lines 40-2~40-n. The host 20 stops providing enabling signal Sen with the first potential (such as 5V) to the power pin Pvbus of the connector 12 and then switches to provide the enabling signal Sen with the second potential (such as 0V). At this time, the power circuit 11 is disabled according to the enabling signal Sen with the second potential (such as 0V). In this situation, the bridge 1 operates at the power saving state, that is, the bridge 1 entirely loses power supplying.

In Step S21, when the host 20 returns to the normal operation state from the power saving state, the host 20 resumes providing the enabling signal Sen with the first potential (such as 5V) to the power pin Pvbus of the connector 12. At this time, the power circuit 11 is enabled according to the enabling signal Sen with the first potential (such as 5V) to provide the first driving voltage Vdri1 and the second driving voltage Vdri2 to the bridge circuit 10 and the peripheral apparatus 30 respectively. Accordingly, the bridge 1 obtains the power supplying again.

After the bridge circuit 10 is re-powered by the first driving voltage Vdri1, in Step S22, the bridge circuit 10 first enables a terminal resistor TR built in the bridge circuit 10. To deserve to be mentioned, the host 20 usually determines whether the bridge 1 is coupled to the host 20 and whether the peripheral apparatus 30 is coupled to the bridge 1 and ready for data accessing according to whether the terminal resistor TR is enabled usually when the bridge 1 is re-powered. That is, even the bridge 1 is coupled to the host 20, when the terminal resistor TR is not enabled, the host 20 determines that the bridge 1 is not coupled to the host 20 and does not establish the link between the host 20 and the bridge 1. In the embodiment, after the bridge circuit 10 is re-powered, the terminal resistor TR is enabled first. After the bridge 1 entirely loses power supplying and then re-powered, a time period has be required to complete the initialization of the peripheral apparatus 30. The terminal resistor TR is usually enabled after completing the initialization of the peripheral apparatus 30. When the host 20 returns to the normal operation state, the bridge 1 and the peripheral apparatus 30 are re-powered immediately. If the host 20 determines that the bridge 1 is not coupled to the host 20 because the terminal resistor TR is not enabled (due to that the initialization of the peripheral apparatus 30 is not complete yet at this time), the link between the host 20 and the bridge 1 can not be established, such that the data transmission procedure suspended at Step S11 can not be resumed. Thus, in an embodiment, after the bridge 1 is re-powered at Step S21, the terminal resistor TR is enabled first at Step S22. In an embodiment, a manner of enabling the terminal resistor TR is shown in FIG. 1. The bridge circuit 10 enables the terminal resistor TR by turning on a switch SW between the terminal resistor TR and one of the lines 40-2~40-n (such as the line 40-n). The switch SW can be controlled by firmware (not shown in figures) of the bridge circuit 10.

At Step S23, after the host 20 leaves the power saving state and returns to the normal operation state, the host 20 determines that the bridge 1 is coupled to the host 20, and the peripheral apparatus 30 is coupled to the bridge 1 and ready for data accessing, thereby resuming the link between the host 20 and the bridge 1. Specifically, after the host 20 leaves the power saving state and returns to the normal operation state, the host 20 sends a resume command to resume the link between the host 20 and the bridge 1, thereby proceeding the data transmission procedure which is suspended previously. Since the terminal resistor TR in the bridge 1 has been enabled in Step S22, a respond can be sent to the host 20 through the firmware of the bridge 1. The host 20 and the bridge 1 can accomplish the handshake procedure to resume the link between the host 20 and the bridge 1.

Figure 3:
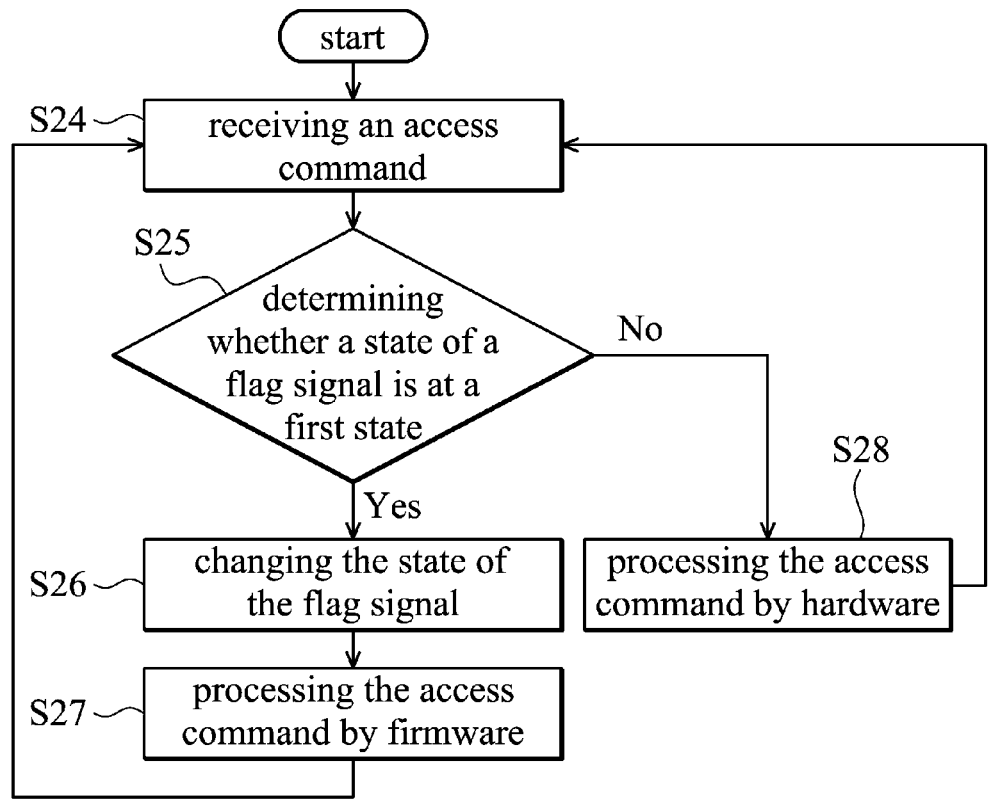
FIG. 3 is a flow chart of another exemplary embodiment of an operation method for a bridge.

FIG. 3 shows a flow chart of an exemplary embodiment of an operation method of the bridge 1 performing a data transmission procedure.

After the link between the host 20 and the bridge 1 is resumed at Step S23, at Step S24, the bridge 1 receives an access command, which was not transmitted by the host 20 before the data transmission procedure is suspended, through the lines 40-2~40-n.

At Step S25, after the access command is received, it is determined that the access command is distributed to hardware 101 (shown in FIG. 1) or firmware (not shown in FIG. 1) in the bridge circuit 10 according to a state of a flag signal Sflag. Thus the hardware 101 or firmware can process the access command. In an embodiment, an interrupt service routine (ISR) of the bridge circuit 10 can be used to receive and distribute the access command. The ISR distributes the access command received by the bridge circuit 10 to the hardware 101 or firmware for processing. When the state of the flag signal Sflag is a first state (such as Sflag=1), the ISR distributes the received access command to the firmware. When the state of the flag signal Sflag is a second state (such as Sflag=0), the ISR distributes the received access command to the hardware 101. The above firmware and the IST are stored in a memory 100 (shown in FIG. 1) of the bridge circuit 10.

At Step S26, the state of the flag signal Sflag is changed. In an embodiment, after the ISR distributes the access command to the firmware, the ISR changes the state of the flag signal Sflag to the second state from the first state. At this step, changing the state of the flag signal Sflag is performed such that the ISR can distribute the following access commands to the hardware 101 for processing, thereby accelerating to complete the data transmission procedure.

At Step S27, after the firmware receives the access command, the firmware responds the host 20 through a handshake procedure and waits for that the initialization of the peripheral apparatus 30 is complete. Then, the firmware processes the access command after the initialization of the peripheral apparatus 30 is complete. Referring to Step S22 and Step S23 of FIG. 2, the bridge 10 enables the terminal resistor TR at Step S22, and the link between the host 20 and the bridge 1 is established at Step S23. However, the initialization of the peripheral apparatus 30 is not complete yet during Step S22 and Step S23. Thus, the first access command which occurs after the data transmission procedure is resumed has to be processed by the firmware. When the firmware responds the host 20, meanwhile the firmware polls the peripheral apparatus 30 to know whether the initialization of the peripheral apparatus 30 is complete. When the initialization of the peripheral apparatus 30 is complete, the firmware can access the data in the peripheral apparatus 30 according to the access command. For example, the access command indicates an access process to the peripheral apparatus 30. When the host 20 receives the response from the firmware through the handshake procedure, the host 20 may wait for a time period to receive the data in the peripheral apparatus 30 corresponding to the access command. As described above, when the firmware responds the host 20, meanwhile the firmware also polls the peripheral apparatus 30 to know whether the initialization of the peripheral apparatus 30 is complete. In the embodiment, the waiting time period of the host 20 can serve as buffer time for the initialization of the peripheral apparatus 30, thereby avoiding errors of the data transmission procedure.

At Step S28, after the hardware 101 of the bridge circuit 10 receives an access command, the hardware 101 responds the host 20 through a handshake procedure and process the access command. In the embodiment, the situation of that the hardware 101 receives an access command means that the initialization of the peripheral apparatus 30 is complete. Thus, the following access commands are processed by the hardware 101.

As described above, when the bridge 1 is re-powered after the power-off state, the firmware of the bridge circuit 10 processes the first received command and waits for that the initialization of the peripheral apparatus 30 is complete. When the initialization of the peripheral apparatus 30 is complete, the firmware performs the data transmission procedure to the peripheral apparatus 30 according to the received command. Accordingly, when the bridge 1 is re-powered, the bridge 1 can proceed with the data transmission procedure which is not complete yet, thereby avoiding failure induced when the commands are processed by the hardware 101 as the conventional bridge dose.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bridge coupled between a host and a peripheral apparatus, comprising:
    a connector for connecting the host, wherein the connector comprises a power pin and a command pin;
    a power circuit for receiving a supplying power and converting the supplying power to a driving voltage when the power circuit is enabled; and
    a bridge circuit powered by the driving voltage and performing a data transmission procedure between the host and the peripheral apparatus,
    wherein the power circuit has an enabling terminal, and the enabling terminal is coupled to the power pin to receive an enabling signal transmitted by the host through the power pin, and
    wherein the power circuit is enabled to provide the driving voltage when the enabling signal is provided with a first potential, and the power circuit is disabled to stop providing the driving voltage when the enabling signal is provided with a second potential.

2. The bridge coupled as claimed in claim 1, wherein the connector is a universal serial bus (USB) connector, and the power pin is a voltage bus (Vbus) pin of the USB connector.

3. The bridge coupled as claimed in claim 1, wherein when the host is at a power saving state, the host transmits the enabling signal provided with the second potential to disable the power circuit.

4. The bridge coupled as claimed in claim 1, wherein when the host is disconnected from the bridge, the enabling signal is provided with the second potential.

5. The bridge coupled as claimed in claim 1, wherein when the host is at a power saving state and the transmits a suspend command to suspend the data transmission procedure, the host transmits the enabling signal provided with the second potential to disable the power circuit, and
    wherein when the host leaves the power saving state, the host transmits the enabling signal provided with the first potential to enable the power circuit to resume providing the driving voltage to the bridge, such that the bridge circuit resumes a link between the host and the bridge circuit.

6. The bridge coupled as claimed in claim 5, wherein the bridge circuit resumes the link by enabling a terminal resistor.

7. The bridge coupled as claimed in claim 5, wherein after the host leaves the power saving state, the host transmits a resume command, and the bridge circuit enables a terminal resistor to resume the link before receiving the resume command.

8. The bridge coupled as claimed in claim 5, wherein the bridge circuit comprises an interrupt service routine (ISR), and
    wherein after the link is resumed, the ISR receives an access command corresponding to the data transmission procedure which is transmitted from the host, and distributes the access command to a firmware or a hardware of the bridge circuit for processing the access command according to a flag signal.

9. The bridge coupled as claimed in claim 8, wherein after the ISR distributes the access command to the firmware, the ISR changes a state of the flag signal.

10. The bridge coupled as claimed in claim 8, wherein when the firmware receives the access command, the firmware sends a respond to the host, and the firmware processes the access command after an initialization of the peripheral apparatus is complete.

11. An operation method for a bridge, wherein the bridge is coupled between a host and a peripheral apparatus, the bridge comprises a connector, a power circuit, and a bridge circuit, and the operation method comprises:
    receiving an enabling signal transmitted from the host through a power pin of the connector and transmitting the enabling signal to an enabling terminal of the power circuit;
    enabling the power circuit to convert a supplying power to a driving voltage and powering the bridge circuit and the peripheral apparatus by the driving voltage when the enabling signal is provided with a first potential; and
    disabling the power circuit to stop providing the driving voltage when the enabling signal is provided with a second potential,
    wherein the host performs a data transmission procedure in company with the peripheral apparatus through a command pin of the connector.

12. The operation method coupled as claimed in claim 11, wherein the connector is a universal serial bus (USB) connector, and the power pin is a voltage bus (Vbus) pin of the USB connector.

13. The operation method coupled as claimed in claim 11 further comprising:
    transmitting the enabling signal provided with the second potential when the host is at power saving state.

14. The operation method coupled as claimed in claim 11, wherein when the host is disconnected from the bridge, the enabling signal is provided with the second potential.

15. The operation method coupled as claimed in claim 11 further comprising:
    disabling the power circuit to stop providing the driving voltage when the host is at a power saving state and suspends the data transmission procedure; and
    enabling the power circuit to resume the driving voltage when the host leaves the power saving state and resumes the data transmission procedure, such that the bridge circuit resumes a link between the host and the bridge circuit.

16. The operation method coupled as claimed in claim 15, wherein the bridge circuit resumes the link by enabling a terminal resistor.

17. The operation method coupled as claimed in claim 15, wherein after the host leaves the power saving state, the bridge circuit receives a resume command transmitted from the host, and the bridge circuit enables a terminal resistor to resume the link before receiving the resume command.

18. The operation method coupled as claimed in claim 15 further comprising:
   receiving an access command corresponding to the data transmission procedure, which is transmitted from the host, through an interrupt service routine (ISR) after the link is resumed; and
   distributing the access command to a firmware or a hardware of the bridge circuit for processing the access command according to a flag signal by the ISR.

19. The operation method coupled as claimed in claim 18 further comprising:
   changing a state of the flag signal after ISR distributes the access command to the firmware.

20. The operation method coupled as claimed in claim 18 further comprising:
   sending a respond to the host by the firmware when the firmware receives the access command; and
   processing the access command by the firmware after an initialization of the peripheral apparatus is complete.

* * * * *